United States Patent [19]

Scherzinger et al.

[11] Patent Number: 5,698,923
[45] Date of Patent: Dec. 16, 1997

[54] EXCITER STATOR INSULATING BOBBIN

[75] Inventors: William M. Scherzinger, Brick; Yefim Novoselsky, Old Bridge; Leon Kasdan, West Long Branch, all of N.J.

[73] Assignee: AlliedSignal Inc., Morristown, N.J.

[21] Appl. No.: 653,529

[22] Filed: May 24, 1996

[51] Int. Cl.⁶ .................................................. H02K 15/04
[52] U.S. Cl. ..................... 310/194; 310/65; 310/215; 310/269; 310/214; 336/198; 336/192; 336/118.41
[58] Field of Search .............................. 310/194, 65, 215, 310/214, 269; 336/192, 198, 118.41

[56] References Cited

U.S. PATENT DOCUMENTS 4,075,790  2/1978  Foldes ........................................ 336/192
4,217,690  8/1980  Morreale ...................................... 29/596
4,520,288  5/1985  Santi ........................................... 310/194

Primary Examiner—Clayton E. LaBalle
Assistant Examiner—Timothy A. J. Williams
Attorney, Agent, or Firm—Verne E. Kreger, Jr.

[57] ABSTRACT

A stator insulating bobbin is disclosed including a plurality of insulating elements. These insulating elements are configured and dimensioned to substantially enclose and insulate an inner surface of a stator assembly. Each of the insulating elements includes a first flange portion and a second flange portion joined by an intermediate web portion.

17 Claims, 4 Drawing Sheets

EXCITER STATOR INSULATING BOBBIN

BACKGROUND OF THE INVENTION

1. Field of the Invention

The present invention relates to electric motors generally and, more particularly, to a novel insulating bobbin for electric motor stator assemblies.

2. Description of Related Art

Electric motors and generators are well known devices which establish and control electromagnetic fields to effect rotary mechanical motion.

An exciter is a separate synchronous salient pole machine encapsulated in the same housing with a main generator. The exciter generates 3 phase AC power which is rectified, usually by rotating diodes, and supplied to the rotating DC field of the main generator. In the manufacture of electric motors and generators, coils or windings of electrically conductive wire are wrapped around each of the exciter stator poles. In addition to the non-conductive insulation on the wire, the stator poles are separately insulated using a variety of insulators and multiple wrappings of nomex tape. Referring to FIGS. 1A-1E, conventional insulators are illustrated. FIG. 1A shows a bottom insulator 2 and FIG. 1C is a top insulator 4. A pole insulator 6 is shown in FIG. 1B and a fork clip 8 is shown in FIG. 1D. A strip of nomex tape 10 is illustrated in FIG. 1E.

FIG. 1F shows an exciter stator assembly 20 with conventional insulators mounted thereon. The exciter stator assembly 20 has an outer surface 22 and an inner surface 24. The inner surface is provided with a multiplicity of radially extending stator poles 26 having flaired interfaces 28. The stator poles 26 define a multiplicity of longitudinal channels 30 for receiving insulated wire or foil (not shown) to form the stator coil.

The bottom of the stator assembly is insulated by two bottom insulators 2 (nomex strips with notches for each pole). These bottom insulators 2 are assembled from each side of the stator core. The pole insulators 6 are positioned adjacent the stator poles 26 and are wrapped with several layers of nomex tape 10. Top insulators 4 are typically slid into place by hand on each stator pole 26. Fork clips 8 are temporarily installed by hand on each stator pole 26 during the winding process to prevent the top insulators 4 from bending.

The insulated wire and the complex system of multiple insulator structure are used to insure that the stator coils do not ground out when the pulses of electrical current are generated. The insulation may, however, be damaged or cracked during winding, installation, operation and/or servicing, resulting in machine failure. The repair of a machine with shorted insulation is quite expensive.

Accordingly, it is an object of the present invention to provide a novel stator insulating bobbin which increases reliability and overall motor life while simplifying assembly and stator construction.

It is a further object of the present invention to provide a novel stator insulating bobbin construction which facilitates uniform and inexpensive fabrication.

Other objects of the present invention, as well as particular features, elements and advantages thereof, will be clarified in or be apparent from the following description and the accompanying figures.

SUMMARY OF THE INVENTION

The present invention achieves the above objects, among others, by providing, in a preferred embodiment, a stator insulating bobbin made up of a plurality of insulating elements configured to at least partially enclose a stator pole, each of the insulating elements having a first flange portion and a second flange portion joined by an intermediate web portion. The separate elements, when installed, interfit to insulate the stator assembly.

Preferably, the stator insulating bobbin is made up of two identical elements of high temperature insulating material which form fit onto the stator pole.

BRIEF DESCRIPTION OF THE DRAWINGS

Understanding of the present invention and the various aspects thereof will be facilitated by reference to the accompanying figures, submitted for purposes of illustration only and not intended to define the scope of the invention, in which.

DETAILED DESCRIPTION OF THE PREFERRED EMBODIMENT

Figure 1A:
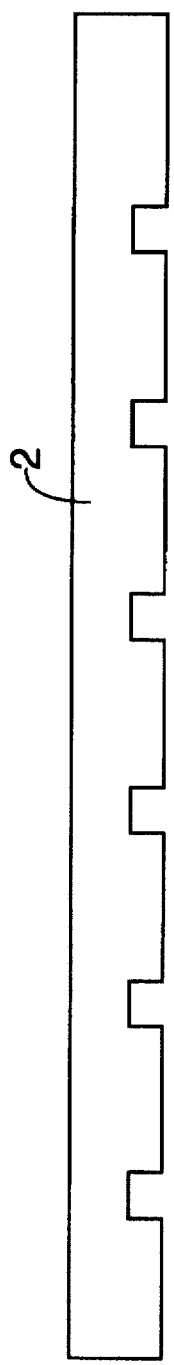
FIGS. 1A-E illustrate conventional insulator elements used to insulate stator assemblies.
Figure 1B:
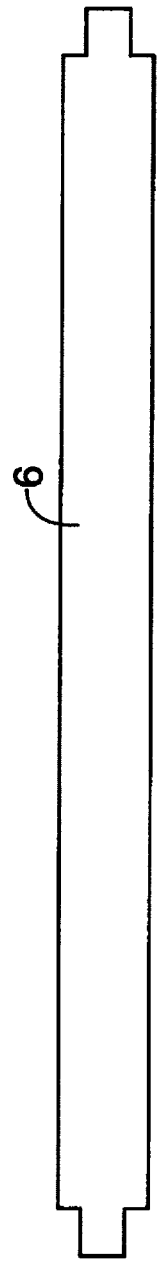
Figure 1E:
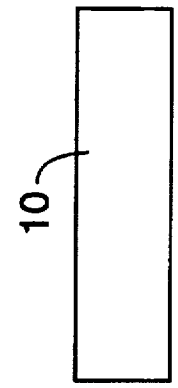
Figure 1D:
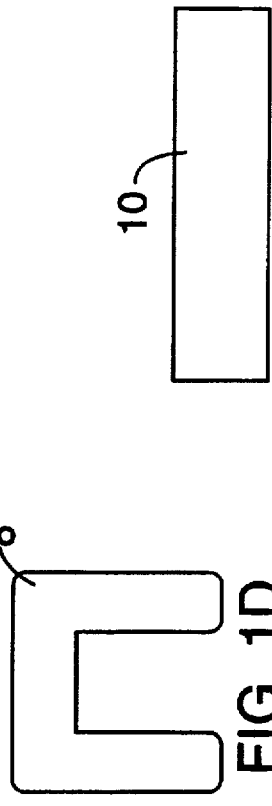
Figure 1C:
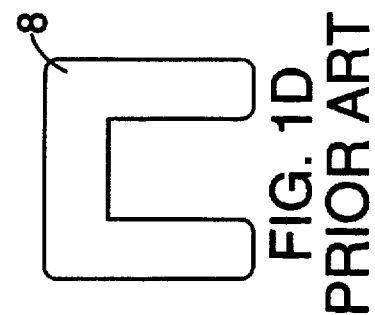
Figure 1F:
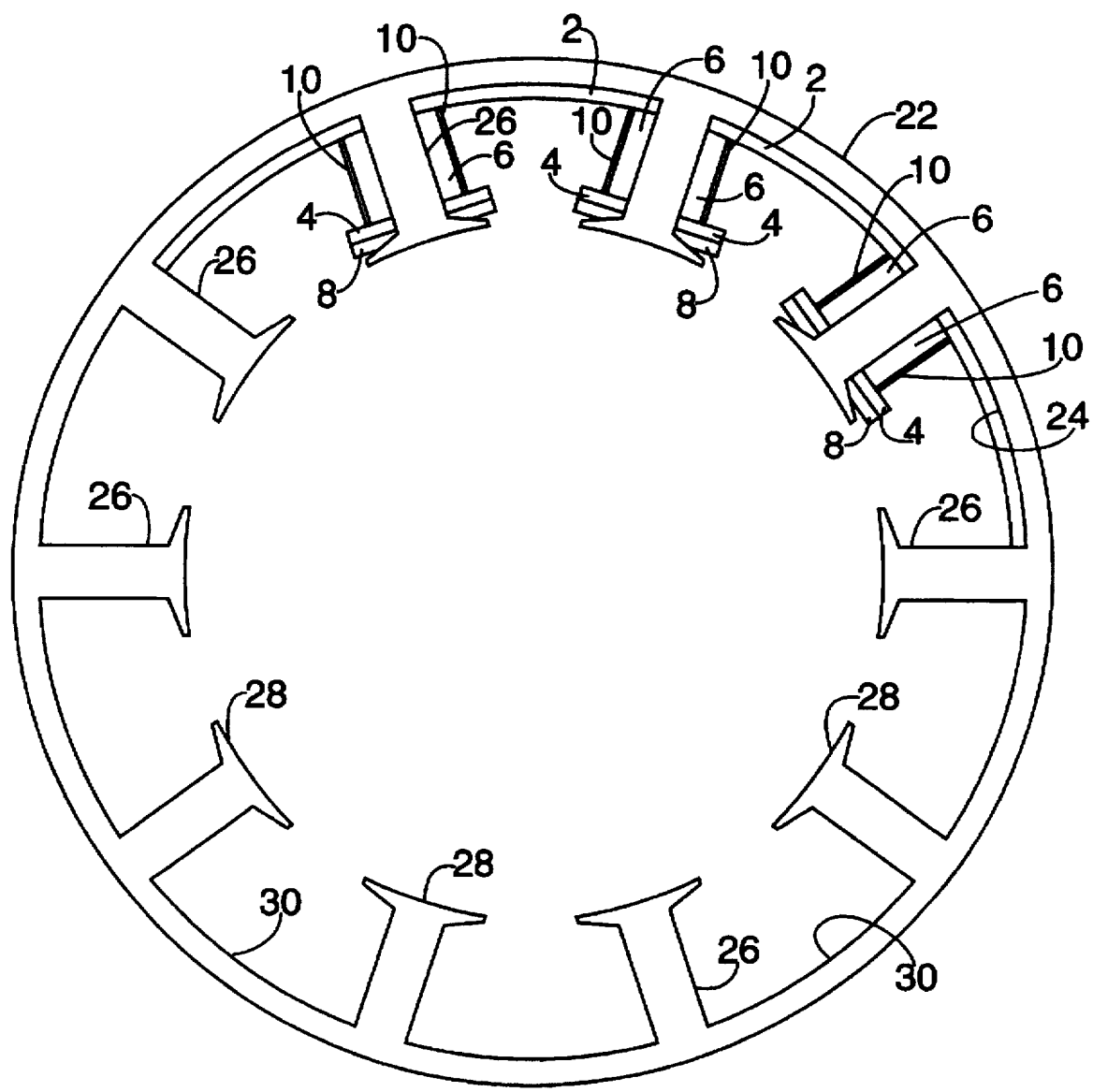
FIG. 1F is a side view of an exciter stator assembly mounting the insulator elements of FIGS. 1A-E.
Figure 2:
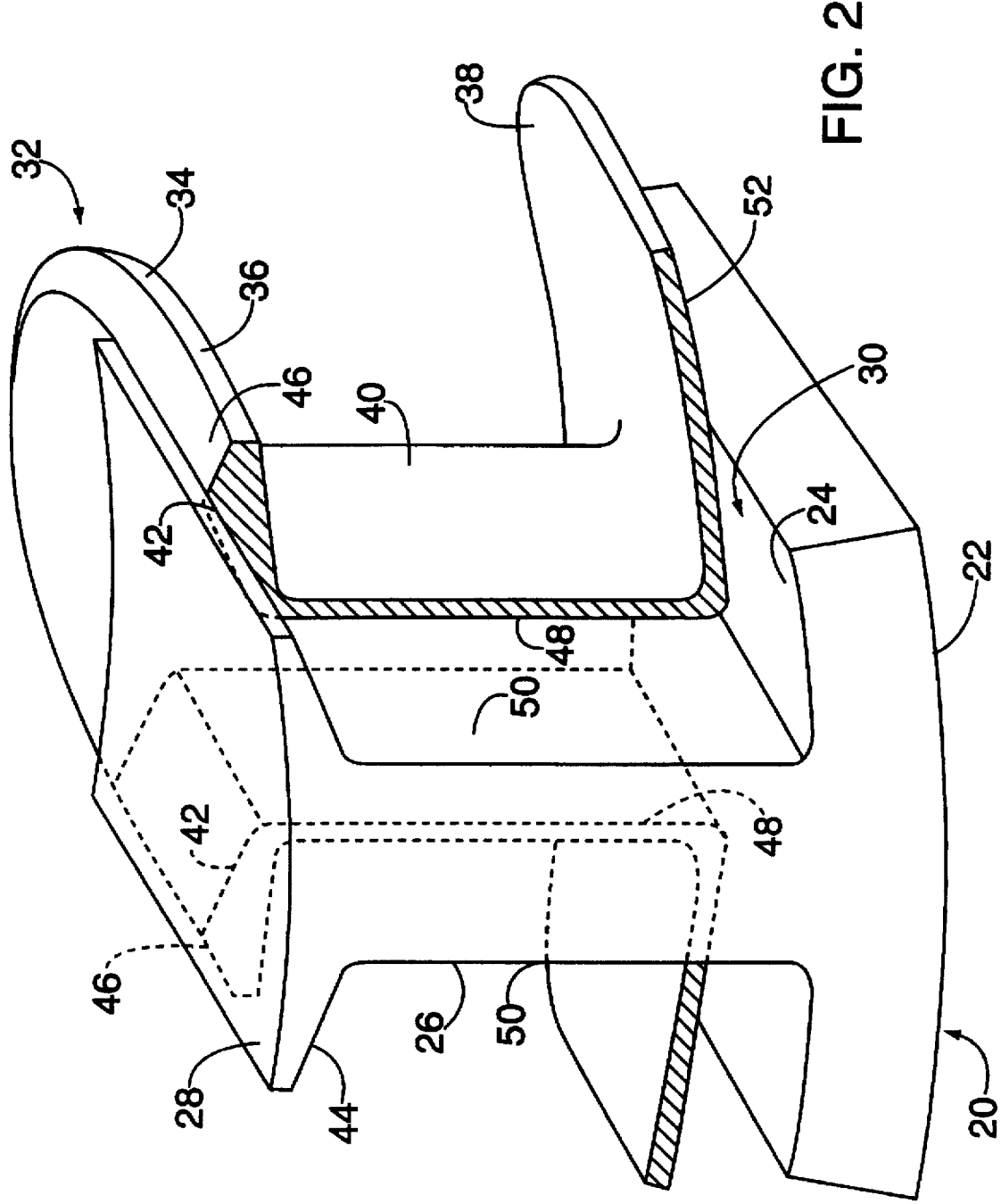
FIG. 2 is a perspective view in partial cross-section of a stator insulating bobbin in accordance with one embodiment of the present invention.
Figure 3:
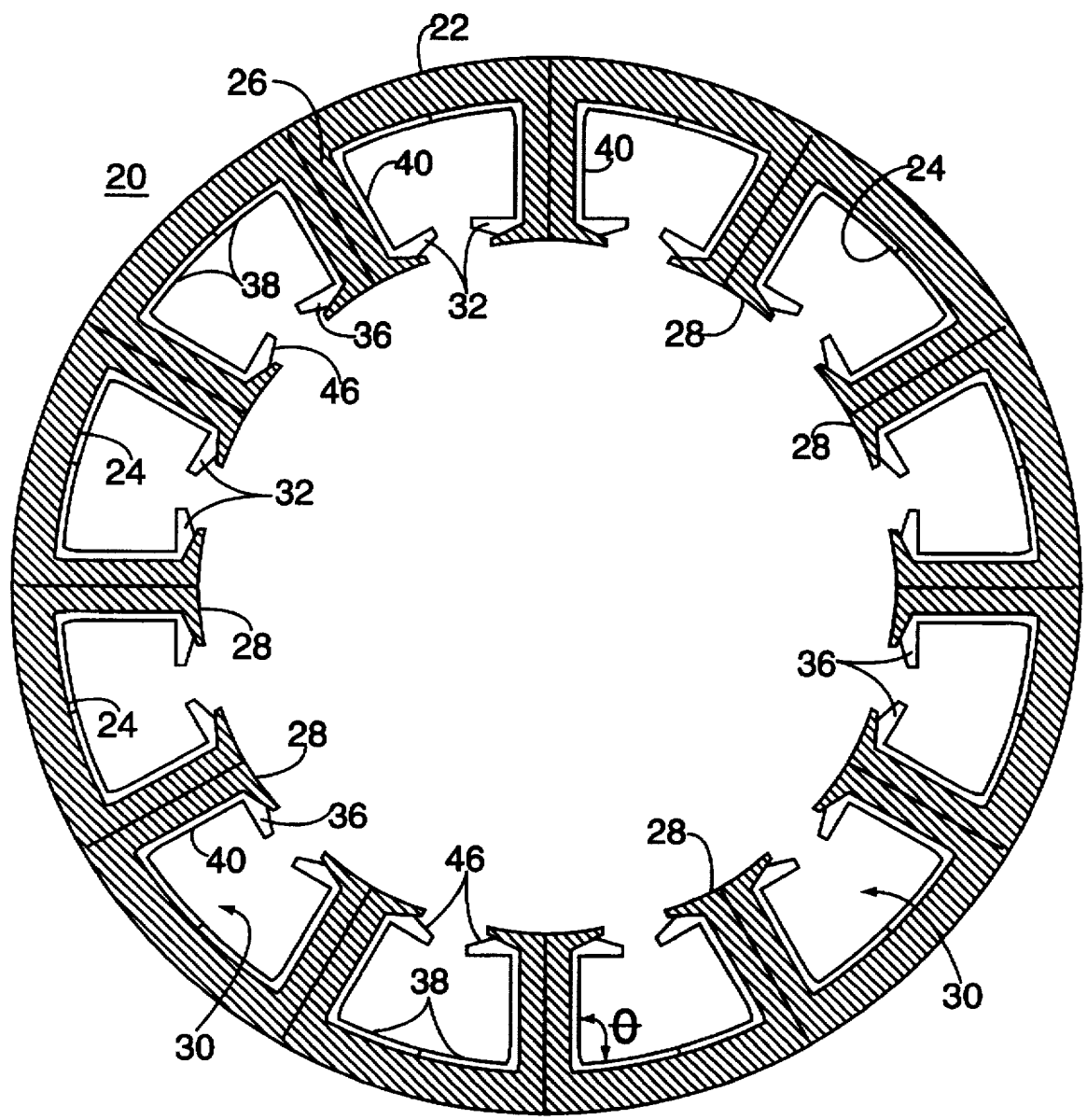
FIG. 3 is a side view in cross-section of a stator assembly mounting the stator insulating bobbins of FIG. 2.

Reference is now made to the figures, in which similar or identical elements are given consistent identifying numerals throughout the various figures. FIGS. 2 and 3 illustrate an exciter stator insulating bobbin configuration in accordance with a preferred embodiment of the present invention. Although the invention is described and illustrated in the context of an electric generator, it will be appreciated that this invention may be used in conjunction with other well known electric motor structures.

Referring now to FIG. 2, a novel stator insulating bobbin for exciter stator assembly 20 is shown generally at 32. Stator insulating bobbin 32 is U-shaped and is preferably molded from a high temperature insulating material such as, for example, Rynite FR530, or Ryton available from Dupont. In the embodiment of FIG. 2, the stator insulating bobbin 32 is made up of two substantially identical (See FIG. 3) molded insulating elements 34 which are configured and dimensioned to form fit and snap into place around the stator pole 26.

Each insulating element 34 includes a first flange portion 36 and a second flange portion 38 joined by a web portion 40. First flange portion 36 includes an inner surface 42 which abuts an undersurface 44 of flaired interface 28. A bevel 46 is formed on a leading edge of first flange portion 36 and extends in a hemispherical configuration around an end portion of insulating element 34. This bevel 46 facilitates automated winding of the stator core by providing a positive clearance and angle as compared to conventional insulators.

Web portion 40 includes an inner surface 48 which frictionally abuts radially extending portions or sidewalls 50 of stator pole 20. Although insulating elements 34 are shown as snap fitting or frictionally engaging the stator pole 20, other configurations are also contemplated including interlocking structure integrally formed with the elements to allow them to engage one another. This interlocking structure may include hermaphroditically configured portions located on mating ends of the insulating elements or tongue and groove structure formed on abutting surfaces.

Second flange portion 38 extends from web portion 40 at an acute angle Θ (See FIG. 3) and includes an inner surface 52 which abuts and insulates a portion of the floor of channel 30.

In this preferred configuration a pair of identical insulating elements 32 are positioned on each stator pole 26 and remain in place while the winding process is performed.

Referring now to FIG. 3, exciter stator assembly 20 is shown with stator insulating bobbins 32 in place on each stator pole 26. Each of the stator insulating bobbins combine to cover and insulate substantially the entire inner surface 24 of the exciter stator assembly 20. This novel method of insulating the magnetic core of a stator greatly simplifies the design, increases the dielectric strength and reduces parts and assembly time. Further generator life and reliability is enhanced.

It will be understood that various modifications may be made to the embodiments disclosed herein. For example, as mentioned above, this invention may be used in conjunction with electric motor structures other than the exciter stator shown above. Accordingly, the above description should not be construed as limiting, but merely as exemplifications of preferred embodiments. Those skilled in the art will envision other modifications within the scope and spirit of the claims appended hereto.

We claim:

1. A stator insulating bobbin comprising:
   a plurality of insulating elements configured to at least partially enclose a stator pole, each said insulating element having a first flange portion having a beveled leading edge and a second flange portion joined by an intermediate web portion, said elements interfitting to insulate a stator assembly.

2. A stator insulating bobbin as in claim 1, wherein a pair of insulating elements are configured to at least partially enclose a stator pole.

3. A stator insulating bobbin as in claim 2, wherein each of the insulating elements is identical to the other insulating elements.

4. A stator insulating bobbin as in claim 1, wherein the insulating elements snap fit into position on the stator pole.

5. A stator insulating bobbin as in claim 1, wherein the insulating elements are molded from a high temperature insulating material.

6. A stator insulating bobbin as in claim 1, wherein respective outer edges of adjacent second flange portions are configured and dimensioned to abut in an area between two stator poles of the stator assembly.

7. A stator bobbin comprising:
   a plurality of U-shaped insulating elements configured to partially enclose a stator pole of a multiple pole stator assembly, each of said insulating elements having a first flange portion and a second flange portion joined by an intermediate web portion, the first and second flange portions extending along substantially an entire length of the intermediate web portion, each insulating element being configured to substantially surround a stator pole, said elements interfitting to insulate a stator assembly.

8. A stator insulating bobbin as in claim 7, wherein the second flange portion extends at an acute angle relative to the intermediate web portion.

9. A stator insulating bobbin as in claim 7, wherein said intermediate web portion is configured and dimensioned to frictionally engage the sidewalls of a stator pole.

10. A stator insulating bobbin as in claim 7, wherein a pair of insulating elements combine to enclose the stator pole.

11. A stator insulating bobbin as in claim 7, wherein the plurality of insulating elements combine to insulate substantially all of an interior surface of the stator assembly.

12. In an electric motor stator assembly having a plurality of radially inwardly extending poles with flaired interfaces, the improvement comprising an insulated bobbin element configured and dimensioned to at least partially enclose both radially inwardly extending portions of one of said stator poles, the bobbin element including a first flange portion and a second flange portion joined by an intermediate web portion.

13. A stator insulating bobbin element as in claim 12, wherein said intermediate web portion is configured and dimensioned to frictionally engage said radially extending portions of said stator pole.

14. A stator insulating bobbin element as in claim 12, wherein a pair of insulating elements combine to enclose the stator pole.

15. A stator insulating bobbin element as in claim 14, wherein the plurality of insulating elements combine to insulate substantially all of an interior surface of the stator assembly.

16. A stator insulating bobbin element as in claim 12, wherein the insulating element is molded from a high temperature insulating material.

17. A stator insulating bobbin element as in claim 14, wherein each of the insulating elements are identical.

* * * * *